July 6, 1954            A. GASSER            2,682,815
CAMERA SYNCHRONIZING ATTACHMENT
Filed April 14, 1951            2 Sheets-Sheet 1
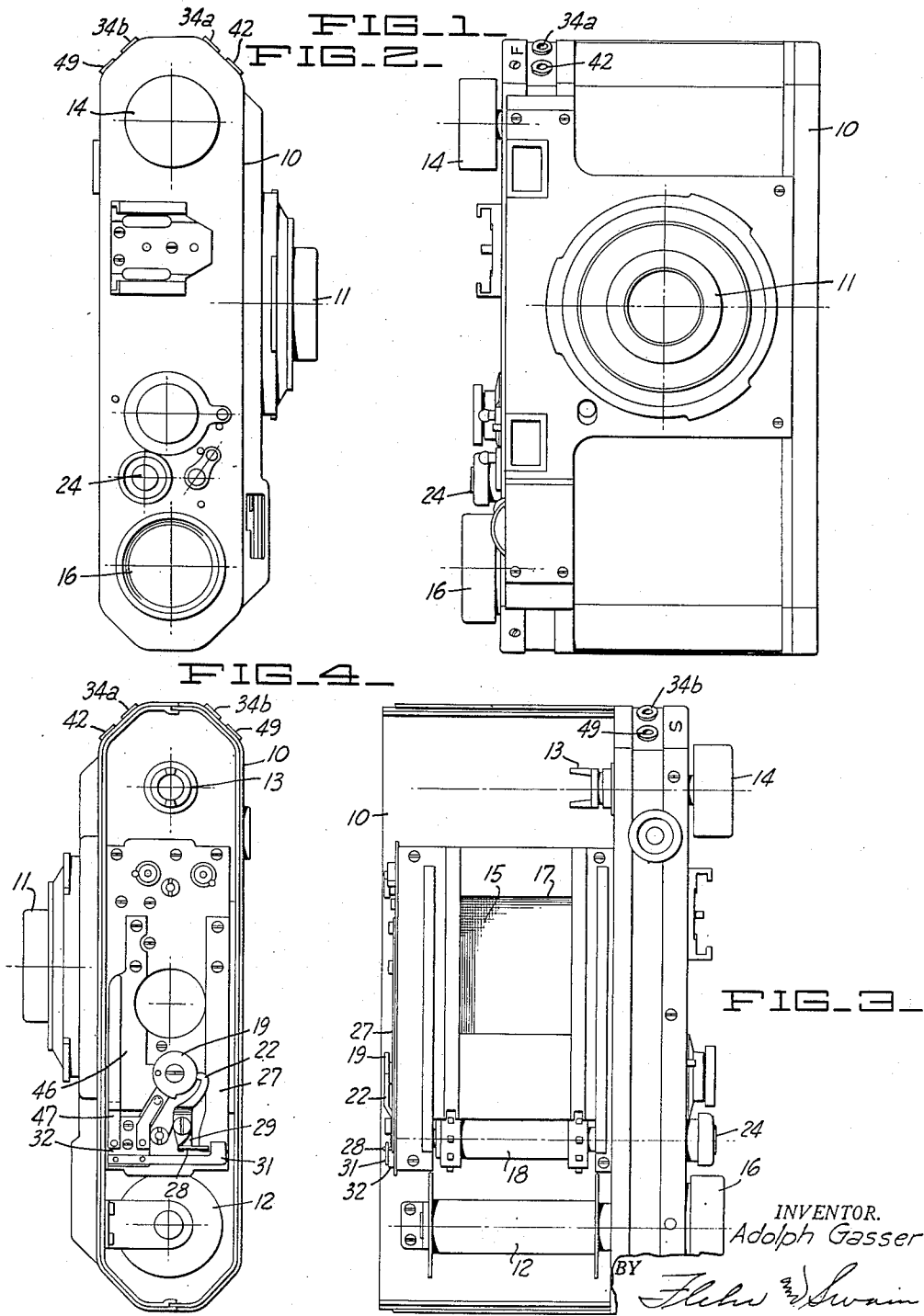

July 6, 1954
A. GASSER
2,682,815
CAMERA SYNCHRONIZING ATTACHMENT
Filed April 14, 1951
2 Sheets-Sheet 2
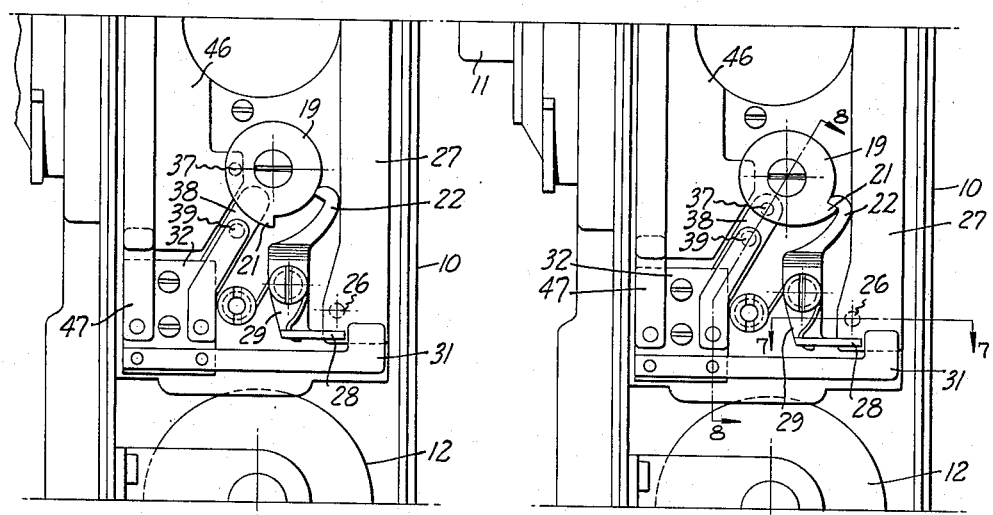
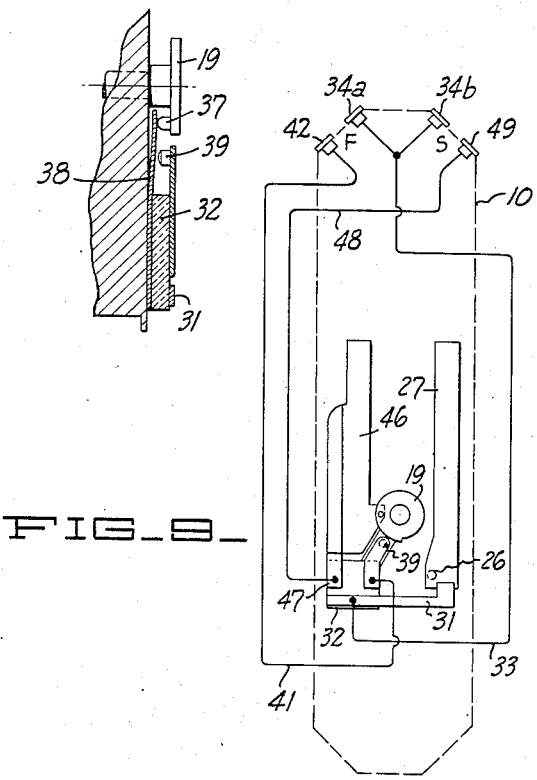
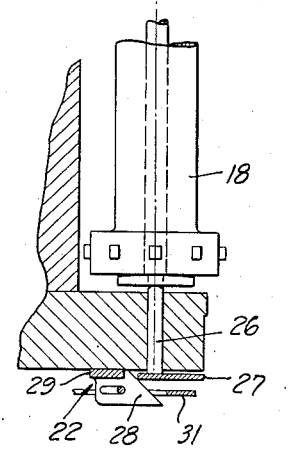
INVENTOR.
Adolph Gasser
BY
ATTORNEYS Patented July 6, 1954

2,682,815

UNITED STATES PATENT OFFICE 2,682,815

CAMERA SYNCHRONIZING ATTACHMENT

Adolph Gasser, San Francisco, Calif.

Application April 14, 1951, Serial No. 221,045

2 Claims. (Cl. 95—11.5)

This invention relates to an attachment adapted to be applied to a camera which is adapted to be utilized in conjunction with flash lights and stroboscopic lights.

More particularly this invention relates to a switch and switch actuating mechanism which is adapted to be used in conjunction with a more or less conventional camera whereby the camera may be utilized for the purpose of taking pictures by flash light or stroboscopic light.

It is a particular object of this invention to provide a synchronization mechanism or switch mechanism which may be built into a conventional camera and which does not increase the size or bulk of the camera and which does not in any way conflict with the ordinary operation of the camera.

It is a further object of this invention to provide a switch of this character which is foolproof in its action and which provides a lockout mechanism whereby the synchronizing or lighting switch mechanism is not apt to be actuated other than at the proper time.

Other objects and advantages of the present invention will be apparent from the following specification taken in conjunction with the accompanying drawings in which:

Figure 1 represents a front plan view of a camera of the type to which my invention is adapted to be affixed;

Figure 2 represents a top view of the camera illustrated in Figure 1;

Figure 3 represents a rear view of the camera illustrated in Figure 1, with a portion of the case being removed, showing the film spools and the camera shutter mechanism;

Figure 4 is a bottom view of the camera illustrated in Figure 3, with the bottom cover removed, illustrating the complete mechanism for synchronizing and actuating the apparatus incorporating my invention;

Figure 5 is an enlarged view of a portion of the camera illustrated in Figure 4 and showing the camera in cocked position;

Figure 6 is an enlarged view of the camera as illustrated in Figure 5, showing the camera in exposed position;

Figure 7 is an enlarged detail taken along the line 7—7 of Figure 5;

Figure 8 is an enlarged detail taken along the line 8—8 of Figure 5; and

Figure 9 represents a circuit diagram of the device utilizing my invention.

As illustrated in Figures 1, 2, 3 and 4, the camera in conjunction with which my invention is adapted to be utilized consists generally of a suitable case 10 which provides a mounting for a lens system 11 and other necessary components of such a camera. The particular type of camera illustrated herein may be referred to as a horizontal focal plane type with a curtain type shutter which travels laterally to open the aperture. This camera also utilizes an easily removable rear and bottom cover whereby the same may be easily loaded and the parts easily inspected and readily accessible for repair and installation.

Since the operation of cameras of this type is well known to those skilled in the art, it is assumed that a further detailed description of the camera is unnecessary. However, it should be pointed out that the film which is adapted to be utilized in conjunction with this camera is generally wound upon a spool 12 from a cartridge or cassette (not shown) which is held in position upon a prong or forked member 13, which in turn is actuated by a suitable control knob 14. The film is adapted to be moved intermittently whereby successive portions of the same will be exposed upon successive operations of the shutter. As has previously been explained, the shutter 15 which is illustrated in conjunction herewith, is of the curtain type and is mounted in a conventional manner upon suitable spools or spindles (not shown herein). It is sufficient to say, however, that the shutter is adapted to be moved from so-called "cocked" position through a so-called "exposed" position in a manner more fully hereinafter to be explained. For example, after one portion of the film has been exposed and it is desired that a subsequent picture be taken, the control knob 16 is rotated. Rotation of the control knob 16 serves to advance the previously exposed portion of the film downwardly, as illustrated in Figure 3, and to position a new unexposed portion of the film over the aperture 17 in order that it will be exposed upon the next release of the shutter. Rotation of the control knob 16 simultaneously serves to set or cock the curtain type shutter. Through a gear train (not shown) knob 16 serves to rotate a member 18 thereby serving to advance the film and the cam disc member 19 which, it will be noted, is rotatably mounted at the bottom portion of the camera and which controls the releasing of the shutter. Referring to Figure 5, it will be noted that when the control knob 16 has been rotated both to advance the film and to cock the shutter, the cam disc 19 is so positioned that the ratchet tooth 21 thereon is engaged by the pawl 22 whereby the device is retained in cocked position. When the device is in cocked position the camera may be said to be ready for exposure.

Exposure is completed by depressing the shutter release button 24 which engages a shaft 26, the lower end of which is adapted to engage a leaf spring member 27 as illustrated in Figures 4 and 7. It should be pointed out that the spring member 27 normally urges the shutter release button to the elevated position illustrated in Figure 4. However, sufficient force upon the shutter release button 24 will overcome the effect of the spring 27 and continued downward movement of the shaft 26 will, through a camming action between the end of the member 27 and the cam surface 28 upon the arm 29, cause the pawl mechanism 22 to swing in a clockwise direction as illustrated in Figures 4 and 5, whereupon the cam disc 19 and the remaining portion of the shutter release mechanism is permitted to rotate in a counterclockwise direction as illustrated in Figures 4 and 5, under the effect of a spring mechanism (not shown). Release of the shutter release button 24 serves to permit the spring leaf 27 to return the shutter release button 24 to its normal position, where it is ready for further operation of the camera.

The release of the cam disc 19 will, as has previously been pointed out, permit the operation of the shutter release mechanism with the result that the shutter 15 will have been actuated to expose that portion of the film immediately adjacent the aperture 17.

It is obvious that the camera which has been heretofore described makes no provision for its utilization in conjunction with flash light exposures or stroboscopic light exposures. In order to permit the utilization of this specific type of camera for these purposes, I have invented a suitable mechanism which will more fully hereinafter be explained. Generally speaking, my device may be said to include three switches which I shall refer to as the loading or arming switch, the flash switch and the strobe switch. The arming or loading switch is a switch which is particularly adapted to be operated by the push rod 26 as the same actuates the leaf spring 27. I have provided a contact or member 31, one end of which overlies the leaf spring 27 and the other end of which is mounted upon an insulated block 32 and which is secured to a conductor 33 which, as illustrated in Figure 9, terminates in a pair of recesses or receptacles 34a and 34b in the upper case of the camera. It may, therefore, be said that upon contact of the members 27 and 31 the arming or loading circuit is completed and the terminals 34a and 34b are grounded.

It will also be recalled that as the shutter release button 24 is depressed to cause engagement of the members 27 and 31, it will also release the cam disc member 19. Release of the cam disc member 19 serves two functions.

It will be noted that the cam disc member 19 is provided on its lower side with a second cam member or pin 37 which, when the release mechanism is in the position illustrated in Figure 5, engages the contact member 38 (see Figure 8), which is normally urged upwardly to engage the contact 39. In other words, when the disc 19 is in the position illustrated in Figure 5, the cam 37 serve to open the otherwise normally closed contacts 38 and 39. It will be noted that the normally closed contacts 38 and 39 control the closing of a circuit which, through conduit 41, grounds the receptacle 42 and completes a circuit from receptacles 34a to receptacle 42.

I have utilized a leaf spring member 46 which also lies under and is adapted to be engaged by the cam 37 when the disc 19 is in the position illustrated generally in Figure 6. When the device is in the position illustrated in Figure 6, the cam 37 engages the arm 46 thereby closing the contact between that arm and a contactor 47, whereby a circuit is completed through a conduit 48 to the receptacle 49 and the receptacle 34b.

For ease of explanation, I will hereafter refer to the receptacles 34a and 42 as flash outlets and the receptacles 34b and 49 as the strobe outlets.

Operation of the device may briefly be described as follows: Let it be assumed that the operator of the camera has exposed one portion of the film and is now ready to proceed with the taking of a subsequent picture. Rotation of the knob 16 will advance a new and unexposed portion of the film into registry with the aperture 17. In addition, rotation of the knob 16 will also serve to cock the curtain type shutter to a position at which it may be released for subsequent exposure of the film. Furthermore, rotation of the knob 16 will, as has previously been described, set or cock my synchronizing or switch mechanism by rotating the cam disc 19 to the position illustrated generally in Figure 5.

The operator then connects either his flash light mechanism or his strobe light mechanism in the flash or strobe outlets, respectively. It must be borne in mind that the equipment which is used in conjunction with this camera includes a source of electric energy usually in the form of a battery and a suitable lamp or bulb mechanism. Therefore, it might be said to be the purpose of this device to complete the circuit between the lamp and the battery.

By depressing the shutter release button 24, the operator will release the curtain type shutter and permit the introduction of light through the aperture 17 to that portion of the film lying immediately adjacent thereto. Also depression of the shutter release button 24 will serve to overcome the effect of the spring 27 and will actuate the pawl 22 in such a manner that it will disengage the cam 21, to permit the operation of the shutter, as has previously been described, by releasing the cam disc 19.

Depression of the shutter release button 24 also causes engagement of the members 27 and 31 thereby completing the loading or arming circuit to both the strobe and flash outlets through the conduit 33 which, it will be recalled, terminates in receptacles 34a and 34b.

The release of the pawl 22 permits the rotation of cam disc 19. Rotation of cam disc 19 serves to disengage the cam member 37 from the spring member 38 with the result that the spring member 38 and the contact 39 are in engagement. This circuit might be said to be a normally closed circuit which is opened only when the camera is in the cocked position illustrated in Figure 5. However, when the member 39 is engaged by the member 38, the circuit to the receptacle 42 of the flash outlet is also completed.

As is well known to those skilled in the art, the duration of a flash exposure is sufficient to carry throughout the entire exposure period during which the shutter is open. This is particularly true in a camera of this type which is adapted to be used with a so-called focal plane flash bulb. In other words, the period of intense light is of sufficient duration that the film will be exposed during the settings of the shutter release mechanism for 1/100 to 1/1000 of a second, for example.

Continued rotation of the cam disc 19 will ultimately result in the same arriving at the position illustrated generally in Figure 6 in which the member 37 engages the spring 46, completing its engagement with the contactor 47 and serving to close the strobe circuit. As the member 37 engages the strip 46 it will depress the same and thus complete the circuit when the shutter is at full exposure. In the camera illustrated herein the strobe synchronization is adapted only to work when the camera is set for a speed of 1/30 of a second to one full second. This is for the reason that the shutter must be completely open when the strobe light is actuated. The duration of the strobe light is in the nature of 1/1000 to 1/5000 of a second and it is, therefore, obvious that the light can only be actuated at and during the time when the shutter is at full aperture.

The purpose of the switch which consists generally of the members 27 and 31 is to load the circuit, or to serve as a lockout mechanism whereby the synchronization mechanism will operate only when the shutter release mechanism is actuated. It is obvious, therefore, that if the members 27 and 31 are not in engagement the circuit to the strobe and flash units will not be completed through the receptacles 34a and 34b. In this event there is no chance that the flash or strobe bulbs will be energized by accident since neither circuit to either the strobe or flash lights will be closed or completed without the loading or arming switch simultaneously or previously having been closed. Since the only method of closing or completing the arming circuit is by operation of the shutter release button 24, and the shutter release button 24 is adapted only to be operated when it is desired that a picture be taken, it is obvious that the lighting circuits will not unintentionally be operated.

I claim:

1. In a synchronizer for a camera for electrically firing either a photoflash or a stroboscopic lamp in a timed relationship with the movement of the focal plane shutter one a curtain roller having a rotatable member driven by the curtain roller, a shutter release button, a cam mounted on said rotatable member, a pair of receptacles for receiving a photoflash attachment, a second pair of receptacles for receiving a stroboscopic lamp attachment, an insulating block mounted on said camera, a contact member mounted on said block and connected to one receptacle in each of said pairs of receptacles to form a common ground, a leaf spring member grounded on said camera and adapted to engage said contact member, said leaf spring member being actuated by said shutter release button, a contact mounted on said insulating block and connected to the other receptacle of said first named pair of receptacles, a contact member grounded on said camera capable of engaging said contact and being held out of engagement with said contact by said cam only when said shutter is in a cocked position, a contact member mounted on said insulating block and connected to the other receptacle of said second pair of receptacles, a second leaf spring grounded on said cam and adapted to engage said last named contact member, and means carried by said cam to cause said last named leaf spring to engage said last named contact member at a predetermined time after initiation of movement of said shutter by said shutter release button.

2. In a synchronizer for a camera for electrically firing either a photoflash or a stroboscopic lamp in a timed relationship with the movement of the focal plane shutter on a curtain roller, a cam driven by said curtain roller, a ratchet tooth on said cam, a spring urged pawl for engaging said ratchet tooth to retain said shutter in a cocked position, a shutter release button, a shutter release shaft adapted to be actuated by said button, means actuated by said shutter release shaft to disengage said pawl from said ratchet tooth to thereby initiate movement of said focal plane shutter, said means including a leaf spring member mounted on said camera to form a ground connection, a pair of receptacles for receiving a photoflash attachment, a second pair of receptacles for receiving a stroboscopic lamp attachment, an insulating block mounted on said camera, a contact member mounted on said block and connected to one receptacle in each of said pair of receptacles to form a common ground, said contact member being adapted to be engaged by said leaf spring, a contact mounted on said block and connected to the other receptacle of said first named pair of receptacles, another contact member grounded on said camera and adapted to engage said contact, a pin carried by said cam, said last named contact member being held out of engagement with said contact by said pin on said cam only when said shutter is in a cocked position, another contact member mounted on said block and connected to the other receptacle of said second pair of receptacles, another leaf spring grounded to said camera and adapted to engage said last named contact member, and means carried by said cam to cause said leaf spring to engage said last named contact member at a predetermined time after initiation of the movement of said shutter by said shutter release button.

References Cited in the file of this patent

UNITED STATES PATENTS

| Number | Name | Date |
| --- | --- | --- |
| 2,282,850 | Brownscombe | May 12, 1942 |
| 2,517,407 | Nilsen | Aug. 1, 1950 |
| 2,520,638 | Hulstein | Aug. 29, 1950 |
| 2,552,213 | Pribus et al. | May 8, 1951 |
| 2,643,597 | Suzukawa | June 30, 1953 |

FOREIGN PATENTS

| Number | Country | Date |
| --- | --- | --- |
| 724,336 | Germany | Aug. 24, 1942 |